(12) United States Patent
Vander Veen et al.

(10) Patent No.: US 8,285,255 B2
(45) Date of Patent: Oct. 9, 2012

(54) VOICEMAIL USER INTERFACE METHODS AND APPARATUS FOR MOBILE COMMUNICATION DEVICES

(75) Inventors: Raymond P. Vander Veen, Waterloo (CA); Mihal Lazaridis, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 2566 days.

(21) Appl. No.: 10/456,715

(22) Filed: Jun. 6, 2003

(65) Prior Publication Data

US 2003/0228863 A1 Dec. 11, 2003

(51) Int. Cl.
*H04L 12/58* (2006.01)

(52) U.S. Cl. ............... 455/412.2; 379/88.11; 379/88.12; 455/412.1; 455/413; 455/466

(58) Field of Classification Search .................. 455/413, 455/412.2; 379/88.12
See application file for complete search history.

(56) References Cited

U.S. PATENT DOCUMENTS

| | | | |
|---|---|---|---|
| 6,282,435 B1 | 8/2001 | Booker et al. | |
| 6,333,973 B1 * | 12/2001 | Smith et al. ................ | 379/88.12 |
| 6,731,926 B1 * | 5/2004 | Link et al. .................. | 455/412.2 |

FOREIGN PATENT DOCUMENTS

| | | |
|---|---|---|
| EP | 0831664 A2 | 3/1998 |
| WO | WO 01/03407 A1 | 1/2001 |

OTHER PUBLICATIONS

"European Search Report for Application 0325367.7",Jan. 15, 2004.

* cited by examiner

*Primary Examiner* — Charles Appiah
*Assistant Examiner* — Mazda Sabouri
(74) *Attorney, Agent, or Firm* — John J. Oskorep, Esq.

(57) ABSTRACT

Voicemail user interface methods and apparatus for mobile communication devices are disclosed. Voicemail notification messages corresponding to voicemail messages are received through a wireless receiver of the mobile device and voicemail message header lines corresponding to them are displayed in a message list. In one illustrative example, the mobile device provides a graphical user interface (GUI) for the end-user with visual objects corresponding to PLAY, REWIND, FAST FORWARD, SKIP BACK, SKIP FORWARD, as examples, which provides for transparency of voicemail system-specific commands. Preferably, the mobile device receives the voicemail notification messages from several different voicemail systems for consolidating such processing using this single common user interface. Each voicemail notification message preferably includes voicemail message summary information, such as a calling party identifier, a message time stamp, and message length, for use in providing the voicemail message header information in the message list. In addition, each voicemail notification message preferably includes voicemail retrieval/processing information, such as a voicemail access telephone number, a voicemail message identification number, and voicemail message processing commands, for use in providing the system interface transparency.

27 Claims, 11 Drawing Sheets

FIG. 1
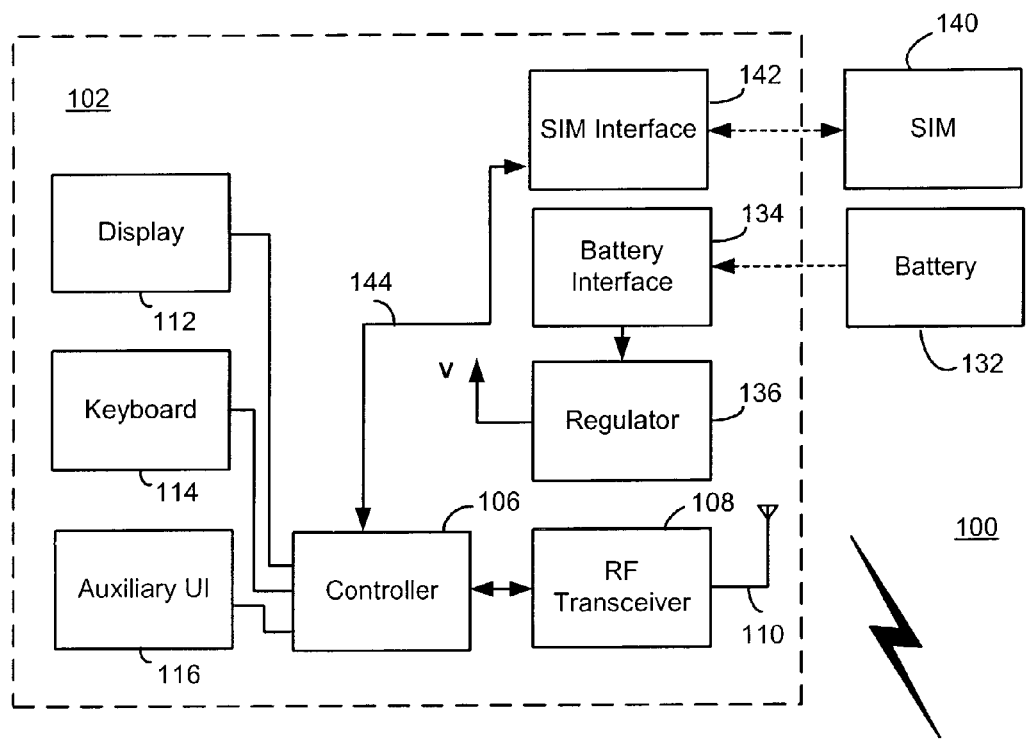
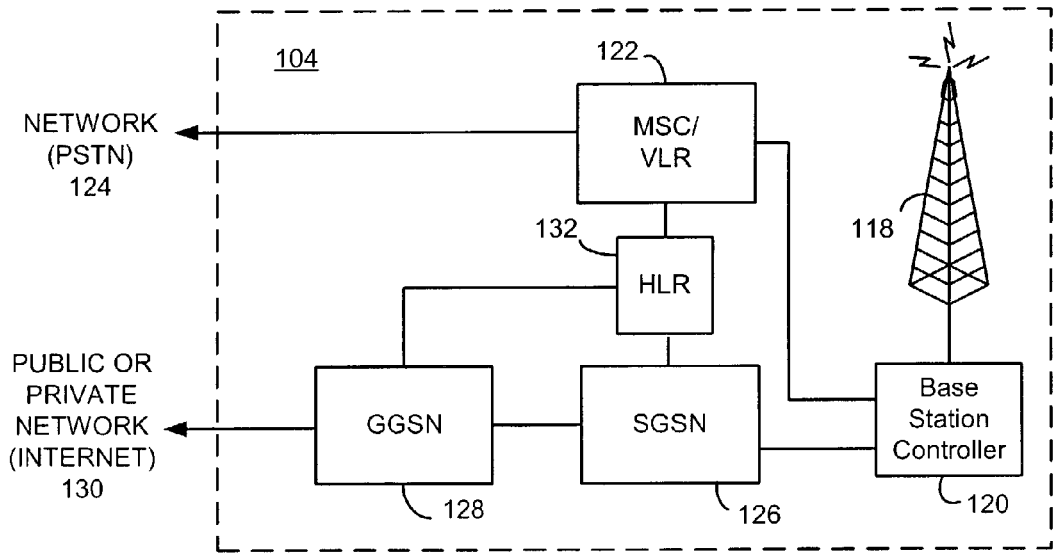

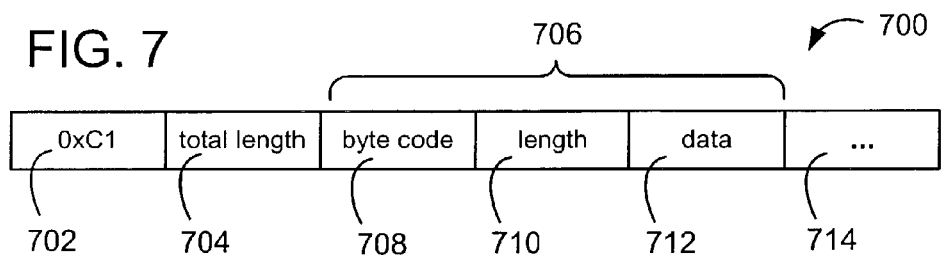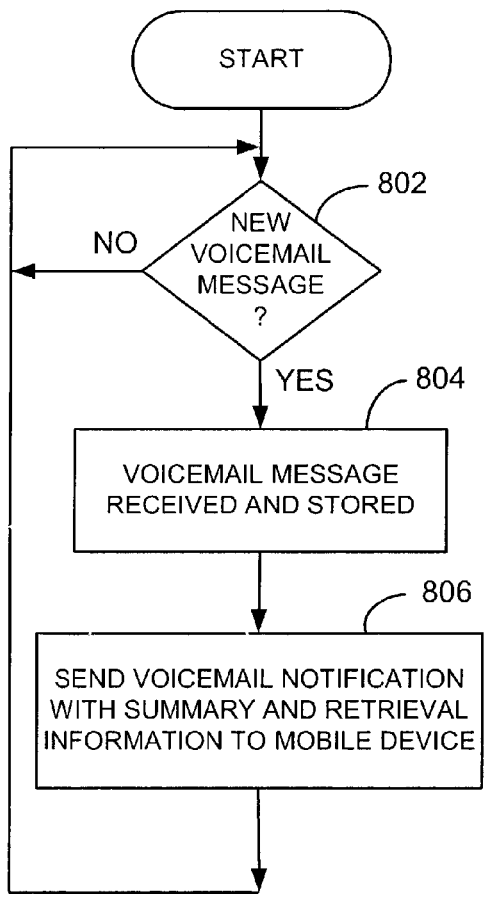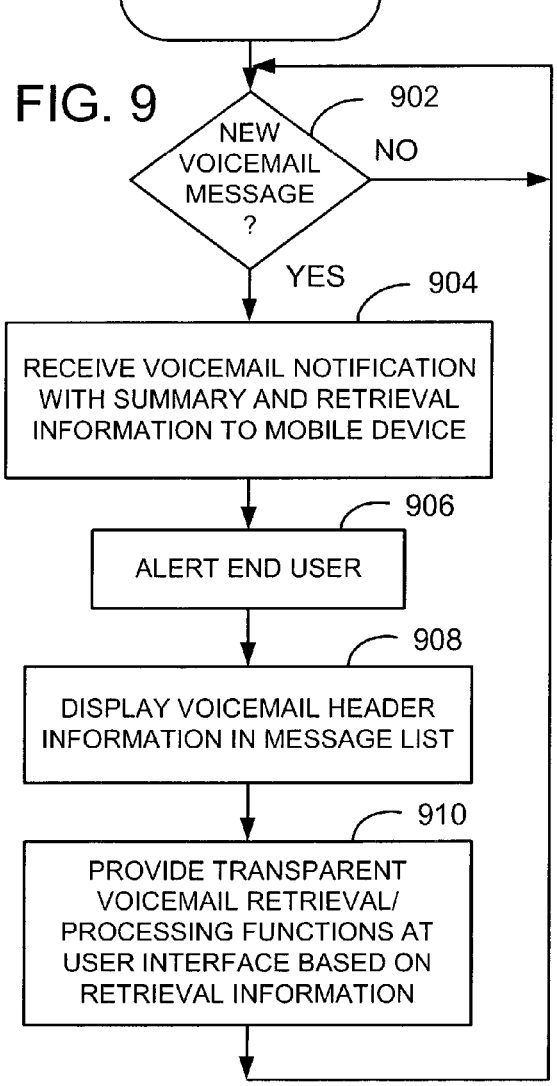

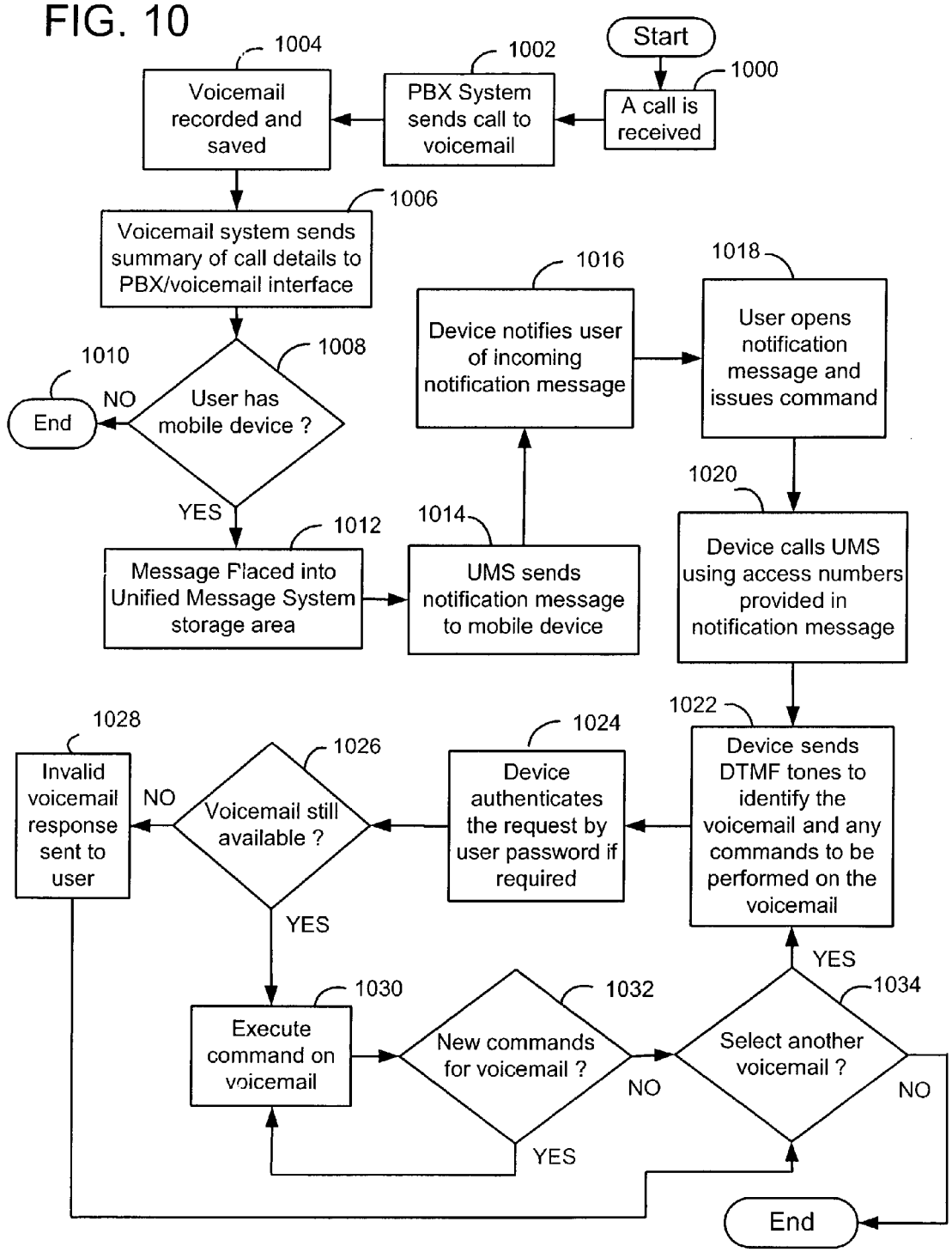

VOICEMAIL USER INTERFACE METHODS AND APPARATUS FOR MOBILE COMMUNICATION DEVICES

BACKGROUND

1. Field of the Invention

The present invention relates generally to mobile communication devices and the associated communication networks within which they operate, and more particularly to user interfaces of mobile communication devices used for retrieving and processing remotely-stored voicemail messages.

2. Description of the Related Art

"Voicemail" is a common feature for practically all voice-based communication products. As examples, home telephone systems now offer voicemail features built right into telephones, telephone companies offer voicemail services in their phone networks, corporations provide voicemail for every desk with integration with e-mail, and wireless carriers offer voicemail packages in connection with their cellular telephones. The average professional may have two or three different voicemail systems that must be checked for new voicemail messages from the home, the office, or cellular telephone. Each voicemail system typically has a different password access and different command codes for the same voicemail functions (e.g. PLAY, REWIND, SAVE, and DELETE).

The result of the above is that the end user must check several different voicemail systems for voicemail while away and remember each set of voicemail command codes. One way to handle this problem is to manually forward all phone calls (i.e. via call forwarding) from all devices to a common unified messaging service (UMS). Here, the end user can check all messages at once from a single voicemail location. However, this solution is prone to problems since the end user may forget to forward phone calls as necessary, may be too busy traveling to regularly check for voicemail messages, and may forget passwords needed to access the voicemail systems.

Accordingly, there is a strong need to provide unified methods and apparatus for handling and processing voicemail messages to reduce the problems created by today's use of multiple voicemail systems. There is also a strong need to simplify the user interface for retrieving and processing voicemail messages from several different voicemail systems.

SUMMARY

Voicemail user interface methods and apparatus for mobile communication devices are described herein. Voicemail notification messages corresponding to voicemail messages are received through a wireless receiver of the mobile device and voicemail message header lines corresponding to them are displayed in a message list. In one illustrative embodiment, the mobile device provides a graphical user interface (GUI) for the end-user with visual objects corresponding to PLAY, REWIND, FAST FORWARD, SKIP BACK, SKIP FORWARD, as examples, which provides for transparency of voicemail system-specific commands. Preferably, the mobile device receives the voicemail notification messages from several different voicemail systems for consolidating such processing using this single common user interface. Each voicemail notification message preferably includes voicemail message summary information, such as a calling party identifier, a message time stamp, and message length, for use in providing voicemail message header information in the message list. In addition, each voicemail notification message preferably includes voicemail retrieval/processing information, such as a voicemail access telephone number, a voicemail message identification number, and voicemail message processing commands, for use in providing the system interface transparency.

BRIEF DESCRIPTION OF THE DRAWINGS

Embodiments of present invention will now be described by way of example with reference to attached figures, wherein:

FIG. 1 is a block diagram which illustrates pertinent components of a mobile communication device which communicates within a wireless communication network;

FIG. 7 is a message format which may be used for communication of voicemail notification messages having voicemail notification payloads (VNPs);

FIG. 8 is a flowchart of a general method of sending voicemail notification information from a voicemail system to a mobile communication device;

FIG. 9 is a flowchart of a general method of receiving and processing voicemail notification information by a mobile communication device;

FIG. 10 is a flowchart which describes an illustrative overview of methods of the present application.

DETAILED DESCRIPTION OF THE PREFERRED EMBODIMENTS

Figure 2:
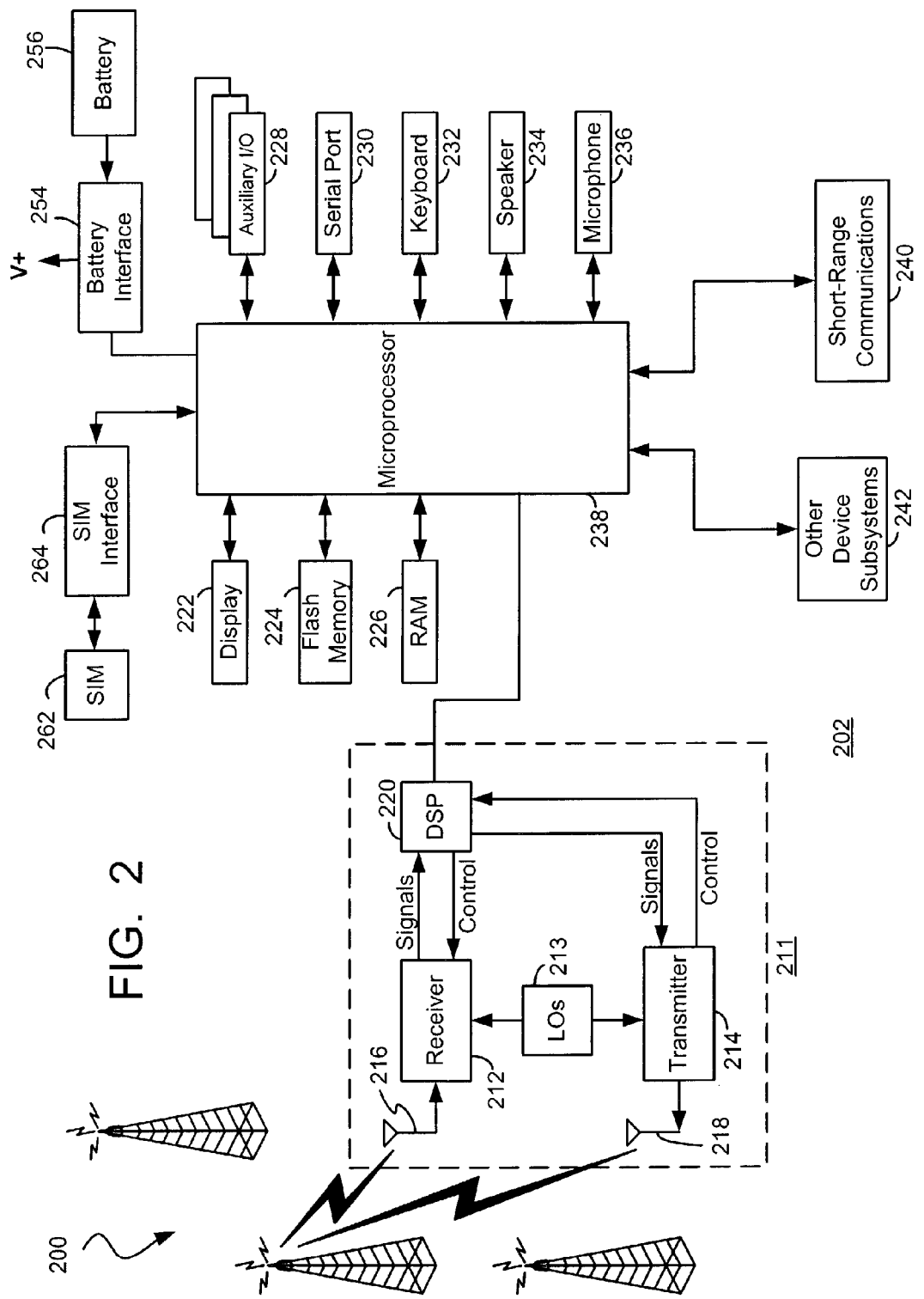
FIG. 2 is a more detailed diagram of a preferred mobile communication device of FIG. 1.

Voicemail user interface methods and apparatus for mobile communication devices are described herein. Voicemail notification messages corresponding to the voicemail messages are received through a wireless receiver of the mobile device, and voicemail message header lines corresponding to them are displayed in a message list. In one illustrative example, the mobile device provides a graphical user interface (GUI) for the end-user with visual objects corresponding to PLAY, REWIND, FAST FORWARD, SKIP BACK, SKIP FORWARD, etc., which provides for transparency of voicemail system-specific commands. Preferably, the mobile device receives the voicemail notification messages from several different voicemail systems for consolidating such processing using this single common user interface. Each voicemail notification message preferably includes voicemail message summary information, such as a calling party identifier, a message time stamp, and message length, for use in providing the voicemail message header information in the message list. In addition, each voicemail notification message preferably includes voicemail retrieval/processing information, such as a voicemail access telephone number, a voicemail message identification number, and voicemail message processing commands, for use in providing the system interface transparency.

FIG. 1 is a block diagram of a communication system 100 which includes a mobile station 102 which communicates through a wireless communication network 104. In the embodiment of FIG. 1, wireless network 104 is configured in accordance with General Packet Radio Service (GPRS) and a Global Systems for Mobile (GSM) technologies; however, any suitable type of network communication protocols may be utilized. For example, the network may be based on code division multiple access (CDMA) or other suitable technologies. As another example, the network may be based on an Integrated Dispatch Enhanced Network (iDEN) which is a high-capacity digital trunked radio system providing integrated voice and data services.

Mobile station 102, which is one type of mobile communication device, preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and base station controller 120, including for example modulation/demodulation and possibly encoding/decoding and encryption/decryption. It is also contemplated that RF transceiver circuitry 108 may perform certain functions in addition to those performed by base station controller 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 132 provides for a mechanical and electrical connection for battery 132. Battery interface 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 are together referred to herein as the fixed transceiver equipment. The fixed transceiver equipment provides wireless network coverage for a particular coverage area commonly referred to as a "cell". The fixed transceiver equipment transmits communication signals to and receives communication signals from mobile stations within its cell via station 118. The fixed transceiver equipment normally performs such functions as modulation and possibly encoding and/or encryption of signals to be transmitted to the mobile station in accordance with particular, usually predetermined, communication protocols and parameters, under control of its controller. The fixed transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the fixed transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application which is loaded onto mobile station 202 may be a personal information manager (PIM) application having the ability to organize and manage data items relating to e-mail messages and voicemail messages, as well as calendar data. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238.

In a data communication mode, a received signal such as a text message (e.g. a short message service or SMS message), an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
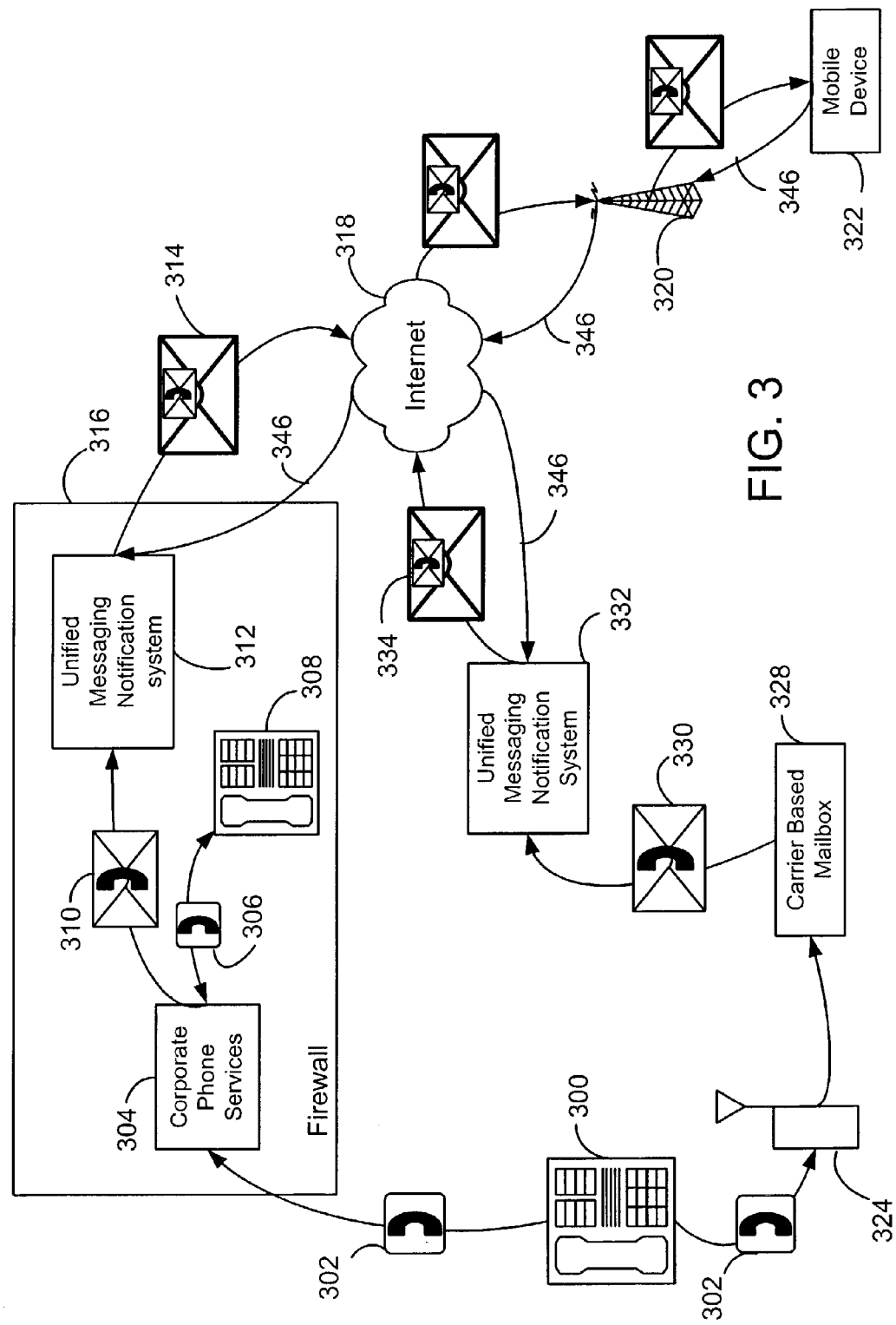
FIG. 3 is a diagram of communication network components which may be used in connection with the methods described herein.

FIG. 3 is a diagram of communication network components for use in describing a general overview of the techniques of the present application. An external source 300, such as a telephone or mobile phone, places a call 302. Call 302 may be routed to a corporate telephone 308 or to another service provider's mobile phone 324. When call 302 is intended for corporate telephone 308, call 302 is routed through a corporate phone service 304 and delivered 306 to corporate telephone 308 which is answered by the user. If the user is unable to answer corporate phone 308, however, the call is sent back 306 to corporate phone service 304 where the caller leaves a voicemail message 310. Voicemail message 310 is left at a unified messaging notification system 312 where it is stored. Without initiation from mobile device 322, system 312 immediately thereafter sends a voicemail notification message 314 via the Internet 318 and a wireless network 320 to the user's mobile device 322. Voicemail notification message 314 may be in the form of an e-mail message or a short message service (SMS) message. Based on voicemail summary information provided in voicemail notification message 314, voicemail message header information associated with voicemail message 310 is displayed in a visual display of mobile device 322. The header information may include, but is not limited to, calling party identification information, time stamp information, and time duration information.

When the user chooses to retrieve voicemail message 310, the user selects a visual object or switch associated with a "PLAY" function in connection with the header message. In response, mobile device 322 places a call 346 to unified messaging notification system 312 and sends one or more commands to play the voicemail message 310 at the mobile device 322. Preferably, voicemail notification message 314 includes not only the information used to provided the header information displayed in the visual display, but also voicemail message retrieval information used to access and process voicemail message 310 from system 312. This information may include, but is not limited to, a voicemail access telephone number, a message identification number, a voicemail system command to select and/or play the voicemail, and other voicemail system commands such as those relating to rewind, fast forward, skip back, skip forward, save, and delete, as examples. During or after voicemail message 310 is played, the user may select from a plurality of switches or visual objects in the display that are associated with "REWIND", "FAST FORWARD", "SKIP BACK", "SKIP FORWARD", "SAVE", or "DELETE", as examples. Mobile device 322 causes the stored voicemail system command corresponding to the user selected function to be sent to system 312 for executing the corresponding function at system 312 for processing voicemail message 310.

On the other hand, if call 302 is placed to a mobile phone 324 associated with the same end user, the call is sent to the mobile phone carrier's mailbox 328 where the caller leaves a voicemail message 330 if the user does not answer. The voicemail message 330 is sent to a unified messaging notification system 332 for the mobile phone's carrier where it is stored. Without initiation from mobile device 322, system 332 sends a voicemail notification message 334 via the Internet 318 and wireless network 320 to the user's mobile device 322. Voicemail notification message 334 may be in the form of an e-mail message or a short message service (SMS) message. Based on voicemail summary information provided in voicemail notification message 334, voicemail message header information associated with voicemail message 330 is displayed in a visual display of mobile device 322. The header information may include, but is not limited to, calling party identification information, time stamp information, and time duration information.

When the user chooses to retrieve voicemail message 330, the user selects a switch or visual object in the visual display associated with a "PLAY" function for this message. In response, mobile device 322 places a call 346 to the unified messaging system 332 and sends one or more commands to play the voicemail 330 at the mobile device 322. Preferably, voicemail notification message 334 includes not only the information used to provided the header information displayed in the visual display, but also voicemail message retrieval information used to access and process voicemail message 330 from system 332. This information may include, but is not limited to, a voicemail access telephone number, a message identification number, a voicemail system command to select and/or play the voicemail, and other voicemail system commands such as those relating to rewind, fast forward, skip back, skip forward, save, and delete, as examples. During or after voicemail message 330 is played, the user may select from a plurality of switches or visual objects in the display that are associated with "REWIND", "FAST FORWARD", "SKIP BACK", "SKIP FORWARD", "SAVE", or "DELETE", as examples. Mobile device 322 causes the stored voicemail system command corresponding to the user selected function to be sent to system 332 for executing the corresponding function at system 332 for processing voicemail message 330. As apparent from the above in FIG. 3, transparency of voicemail system-specific commands is provided in connection with use of several different voicemail systems.

Figure 4:
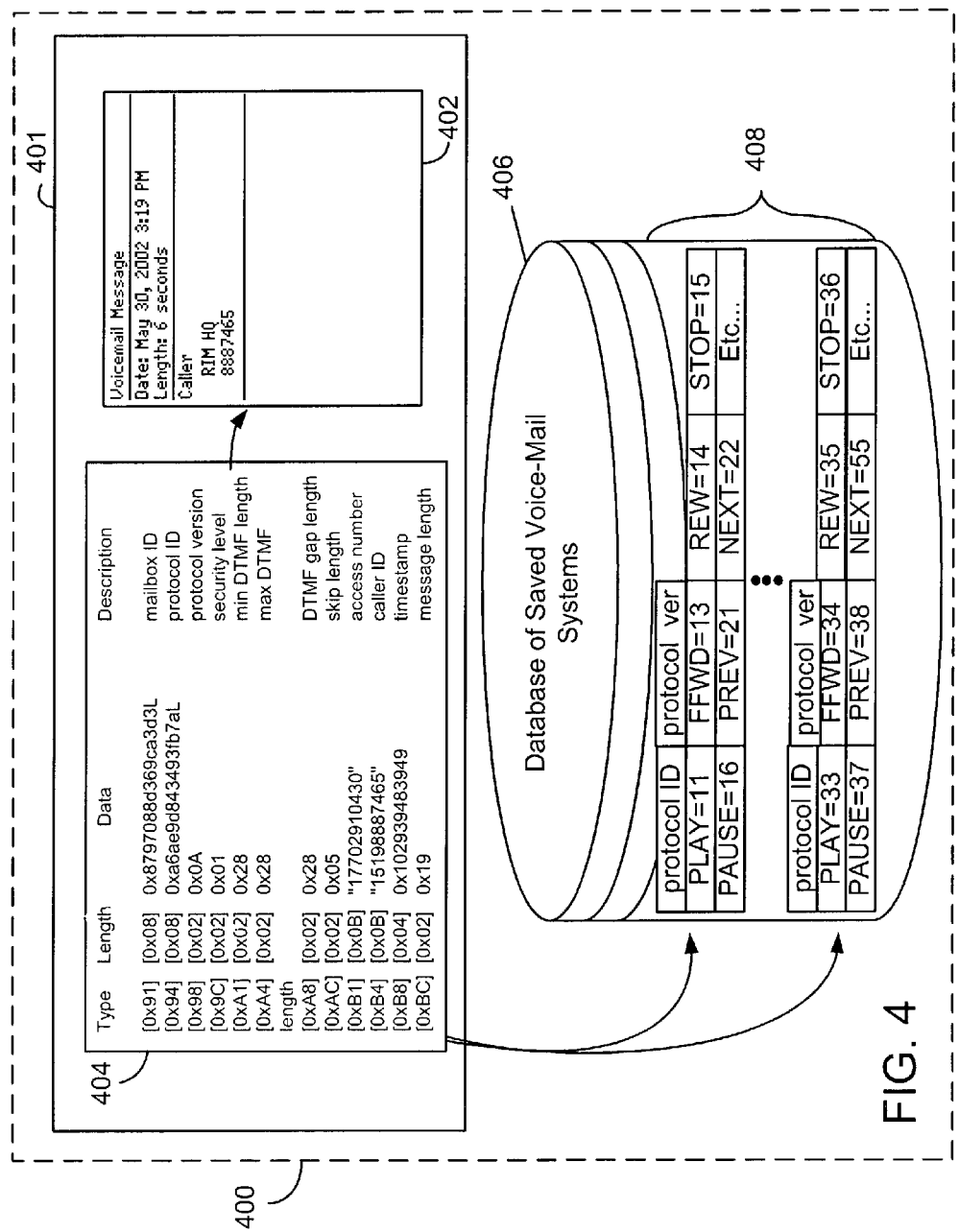
FIG. 4 is an example of voicemail and database information which may be used for that described in the present application.

FIG. 4 is one example illustration of voicemail processing data which may stored in a mobile device. A software application 401 on a mobile device 400 receives a voicemail notification message which carries a voicemail notification payload (VNP) 404. As initially received, VNP 404 may be embodied in a short message service (SMS) message or, alternatively, in an attachment of an e-mail message. VNP 404 may include information which is made visible to the user in mobile device's display 402. This information, which may be referred to as voicemail message summary information, may include information such as the length of the message, the caller's identification, the caller's phone number, and the time and date of the voicemail. VNP 404 may also include information not made visible to the user but used by mobile device 400 to retrieve, play, and further process voicemail messages from a voicemail system. This information, which may be referred to as voicemail message retrieval information, may include information such as the identification of the service provider's mailbox (mailbox ID), the protocol that the service provider uses (protocol ID), the version of the protocol used, information about the length of DTMF tones required by the protocol, and the number that the device must call to retrieve the voicemail message.

VNP 404 is associated with a database 406 on mobile device 400 with that sets out different command sets for different voicemail system protocols. That is, for each different protocol ID, database 406 associates a set of voicemail functions with their appropriate DTMF tone commands 408 used by the service provider to access and process voicemail messages. When a user selects a voicemail processing function (e.g. FAST FORWARD) at the user interface, mobile device 400 causes the associated DTMF tone command for that function to be sent. Database 406 may be populated with this information from a service provider when mobile device 400 makes an initial call to the service provider. Alternatively, a user may also populate database 406 with this information. Database 406 is further associated with another database (not shown) on mobile device 400 that consists of the user passwords for each unified messaging system from which mobile device 400 receives voicemail notification messages.

Figure 5:
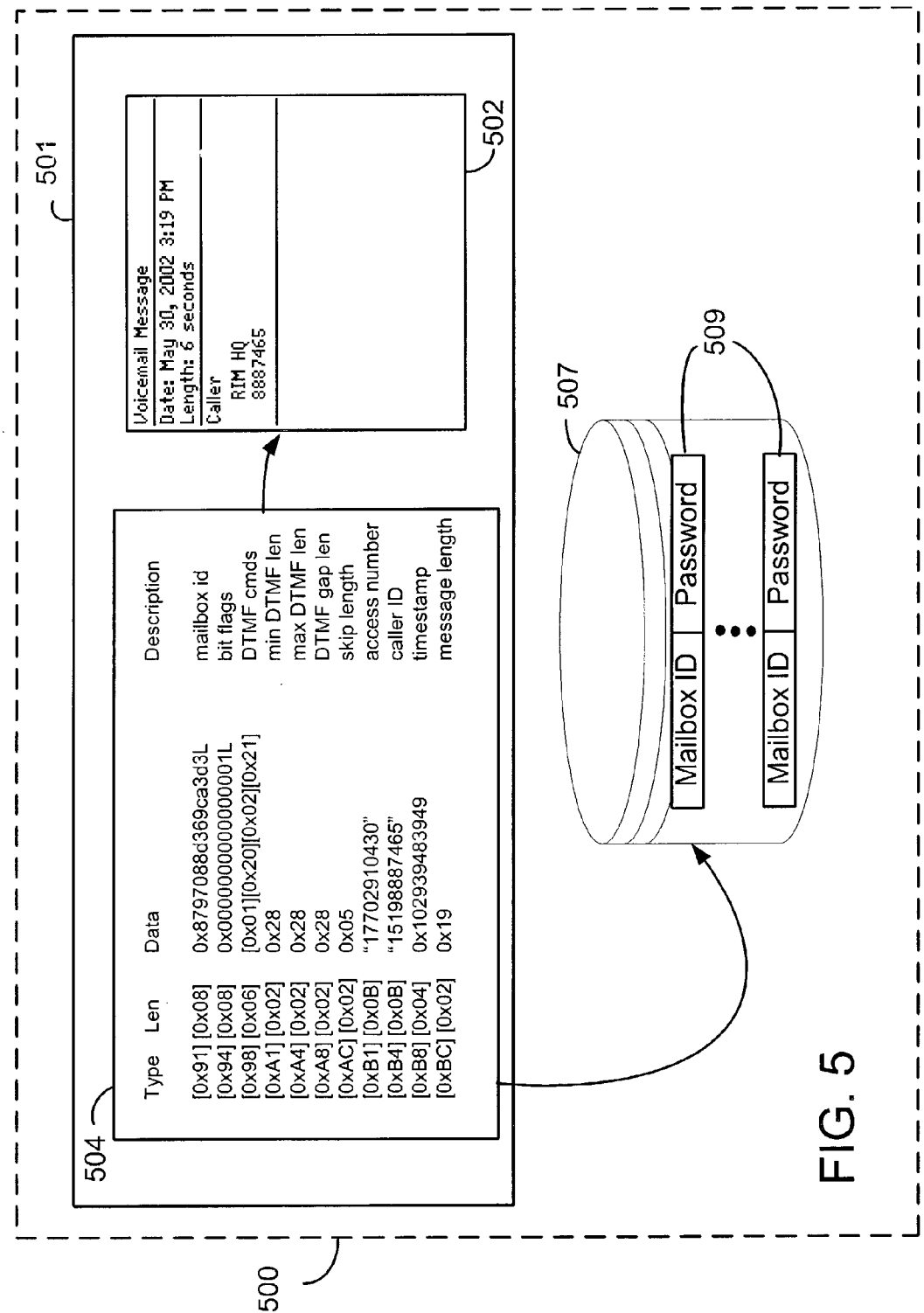
FIG. 5 is another example of voicemail and database information which may be used for that described in the present application.

FIG. 5 shows a different example of voicemail processing data on a mobile device 500. Again, a software application 501 on a mobile device 500 receives a voicemail notification message which carries a voicemail notification payload (VNP) 504. As initially received, VNP 504 may be embodied in an SMS message or, alternatively, in an attachment of an e-mail message. As in FIG. 4, VNP 504 may include information which is made visible to the user in mobile device's display 502. This information, which may be referred to as voicemail message summary information, may include information such as the length of the message, the calling party's identification, the caller's phone number, and the time and date of the voicemail. VNP 504 includes other information as shown, including bit flags to determined whether a password is required or not, a mailbox ID, information about the required lengths of DTMF tones, a voicemail system access number, etc. VNP 504 also includes all the DTMF tone commands necessary for mobile device 500 to play and process voicemail messages, instead of the prestored protocol information described in relation to FIG. 4. This difference in VNPs means that mobile device 500 no longer requires the different commands for each protocol to be prestored in the database, but rather receives such commands in each voicemail notification message. Mobile device 500 only needs a database 507 of passwords 509 associated with each mailbox ID which the device references when a given password 509 is required by the unified messaging system for authentication.

Figure 6:
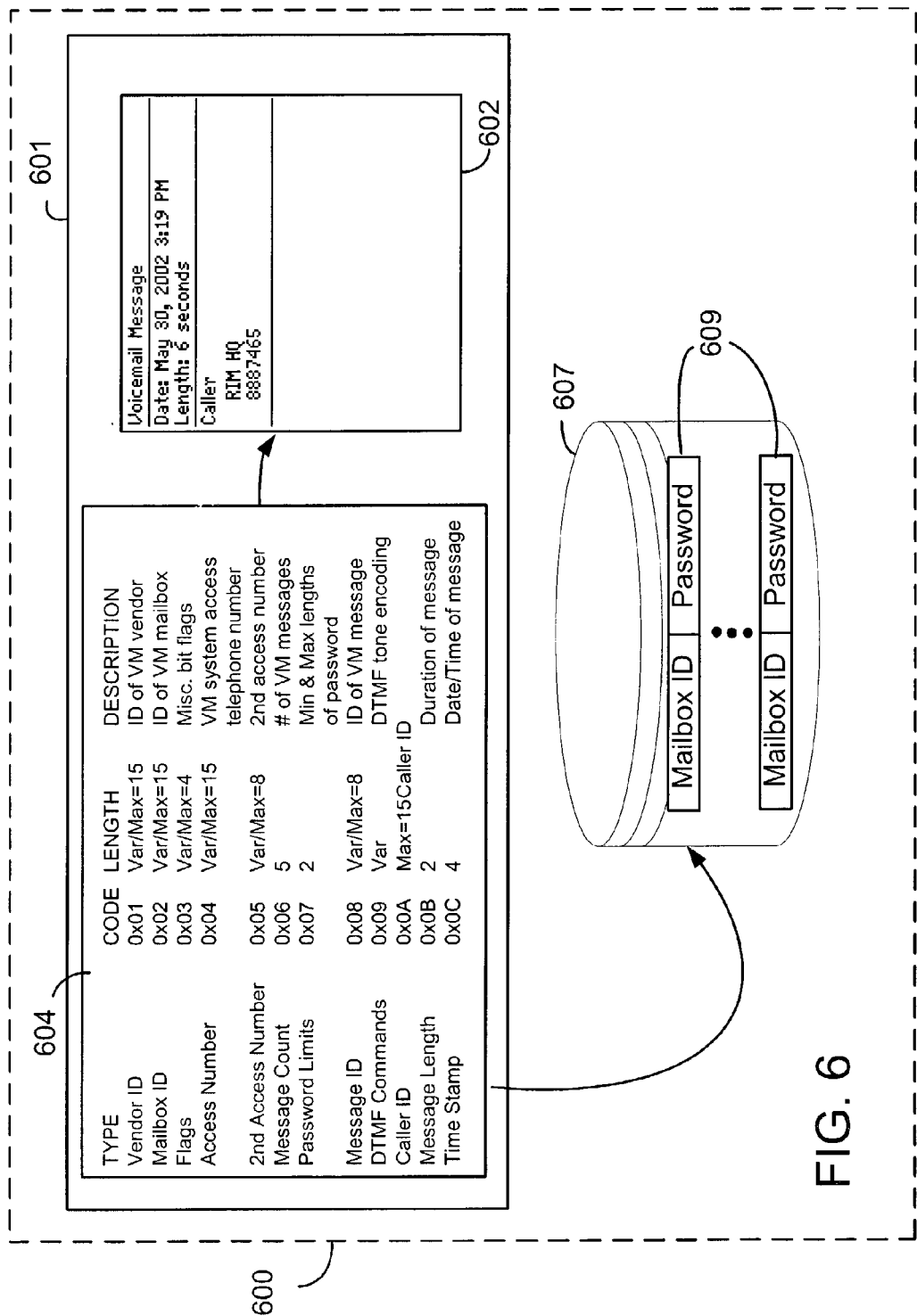
FIG. 6 is yet another example of voicemail and database information which may be used for that described in the present application.

FIG. 6 shows yet another example of voicemail processing data on a mobile device 600. Again, a software application 601 on a mobile device 600 receives a voicemail notification message which carries a voicemail notification payload (VNP) 604. As initially received, VNP 604 may be embodied in an SMS message or, alternatively, in an attachment of an e-mail message. As in FIGS. 4 and 5, VNP 604 may include information which is made visible to the user in mobile device's display 602. This information, which may be referred to as voicemail message summary information, may include information such as the length of the message, the calling party's identification, the caller's phone number, and the time and date of the voicemail. VNP 604 includes additional information as shown, such as a voicemail vendor identification, a secondary telephone access number, a message identification number, and a number of voicemail messages. As in FIG. 4, mobile device 600 has a database 607 of passwords 609 associated with each mailbox ID which the device references when a given password 609 is required by the unified messaging system for authentication.

FIG. 7 is an example illustration of a message format 700 used to communicate a voicemail notification message having a voicemail notification payload (VNP). Message format 700 includes a byte string that specifies all relevant information about the voicemail message, including the voicemail message summary information and the voicemail message retrieval/processing information. Message format 700 may be provided in an e-mail message or, alternatively, in a short message service (SMS) message. If provided in an e-mail message, it may be located within an attachment of the e-mail message. If provided in an SMS message, it may be located in the body of the SMS message or, alternatively, in a data header of the SMS message. For the latter in particular, GSM 3.40 9.2.3.24 provides for available data header space which may used for such voicemail notification purpose.

The first byte in message format 700 is a voicemail notification message code 702 used to indicate that the message pertains to a voicemail notification. As shown in this example, the value "0×C1" is designated as voicemail notification message code 702 to indicate that the message is a voicemail notification message. The second byte in message format 700 specifies a total length 704 of the message, which may be a maximum of 140 bytes. After the total length information 704, what follows is a plurality of type-length encoded fields (such as a type-length encoded field 706) most pertinent to the VNP. Following type-length encoded field 706, additional type-length encoded fields 714 are preferably provided. Each type-length encoded field 706 includes a byte code field 708, a length field 710, and a voicemail-related data field 712. Each byte code field 708 includes data which describes the type of voicemail-related data which is inserted within voicemail-related data field 712. Each length field 710 describes the length (e.g. in bytes) of the voicemail-related data which is inserted within voicemail-related data field 712.

The following Table 1 outlines one example of information that may appear in the VNP, such as that which may be included in message format 700 of FIG. 7. Note that the information in Table 1 corresponds to that information described in the example of FIG. 4. This data is customizable with respect to the service provider.

TABLE 1

Example of Voicemail Notification Fields.

| TYPE | BYTE CODE | LENGTH | DESCRIPTION |
| --- | --- | --- | --- |
| MAILBOX_ID | 0 × 91 | 8 | The unique ID of the voice mailbox containing the voicemail message. (long hash) |
| PROTOCOL_ID | 0 × 94 | 8 | The ID of the protocol being used. (long hash) |
| PROTOCOL_VERSION | 0 × 98 | 1 | The version of the protocol being used. |
| SECURITY_LEVEL | 0 × 9C | 1 | 0 indicates MSISDN only; 1 indicates MSISDN and password are required. |
| ACCESS_NUMBER | 0 × B8 | 16 | The voicemail access number that is to be called in order to play the message. |
| CALLER_ID | 0 × BC | 16 | The caller ID (phone number) of the caller who left the voicemail message, if available. |
| TIMESTAMP | 0 × D1 | 8 | The date/time at which the message was left. (64-bit long) |
| MESSAGE_LENGTH | 0 × D4 | 2 | The length in seconds of the voicemail message. |

In Table 1, the MAILBOX_ID is a unique identifier of the service provider voice mailbox that contains the voicemail message. Eight bytes are preferably allocated for this identifier, which should be a long hash value of a string describing the mailbox. The mobile device may use the mailbox ID to determine which password to use when making a voicemail access call.

The PROTOCOL_ID is a unique identifier for the protocol used by the service provider. Four bytes are allocated for this ID, which should be a long hash value of the string describing the protocol. The PROTOCOL_VERSION is version of the protocol to be used for the given voicemail message. The protocol ID and version together indicate the mappings between the access control commands and the corresponding DTMF tones.

The SECURITY_LEVEL indicates the security level required for authentication from the service provider. For example, the provider may only require the mobile subscriber ISDN (integrate services digital network) (MSISDN) or it may require the MSISDN plus password. In one embodiment, a 0 indicates MSISDN only; a 1 indicates MSISDN plus password.

The ACCESS_NUMBER is the phone number to be called by the device in order to play the voicemail. The CALLER_ID is the phone number of the caller who left the voicemail message. The number must be fully qualified, including country code, area/city code, and phone number. The TIMESTAMP is the time at which the voicemail message was deposited in the voice mailbox, specified as the number of milliseconds since midnight the Jan. 1, 1970 UTC. The MESSAGE_LENGTH is length in seconds of the voicemail message.

The VNP may also include such information as DTMF tone lengths. The MIN_DTMF_TONE_LENGTH is the minimum length in milliseconds of an individual DTMF tone for the receiving voicemail system can correctly recognize the tone. MAX_DTMF_TONE_LENGTH is the maximum length in milliseconds of an individual DTMF tone in order that the receiving voicemail system can correctly recognize the tone. The DTMF_GAP_LENGTH is the minimum length in milliseconds of the gap between individual DTMF tones. The SKIP_LENGTH is length in seconds that playback skips forward or backward when a SKIP_FORWARD or SKIP_BACKWARD command is received by the voicemail system.

Referring now to the following Table 2, a different example of information that may appear in the VNP, such as that which may be included in message format 700 of FIG. 7, is shown. Note that the information in Table 2 corresponds specifically to that information described in the example of FIG. 5. This data is also customizable with respect to the service provider.

TABLE 2

An alternative example of voicemail notification data that may appear in VNP.

| TYPE | BYTE CODE | LENGTH | DESCRIPTION |
|---|---|---|---|
| MAILBOX_ID | 0 × 91 | 8 | The unique ID of the voice mailbox containing the voicemail message. (long hash) |
| FLAGS | 0 × 94 | 8 | Misc. bit flags. E.G., whether a password is required for authentication. |
| DTMF_CMDS | 0 × 98 | Variable length | Encoding of DTMF commands semantics. |
| ACCESS_NUMBER | 0 × B8 | 16 | The voicemail access number that is to be called in order to play the message. |
| CALLER_ID | 0 × BC | 16 | The caller ID (phone number) of the caller who left the voicemail message, if available. |
| TIMESTAMP | 0 × D1 | 8 | The date/time at which the message was left. (64-bit long) |
| MESSAGE_LENGTH | 0 × D4 | 2 | The length in seconds of the voicemail message. |

In Table 2, the MAILBOX_ID, SECURITY_LEVEL, ACCESS_NUMBER, CALLER_ID, TIMESTAMP, and MESSAGE_LENGTH serve the same purpose as in the previous example of VNP data. However, in this embodiment, there is no allocation for identifying the protocol or protocol version. Instead, this VNP example specifies all the voicemail commands necessary to play and manipulate the voicemail within the VNP. In this embodiment, FLAGS are bit flags specifying various configuration options. This may indicate whether a password is required for authentication.

Referring now to the following Table 3, even another example of information that may appear in the VNP, such as that which may be included in message format 700 of FIG. 7, is shown. Note that the information in Table 3 corresponds specifically to that information described in the example of FIG. 6. This data is also customizable with respect to the service provider.

TABLE 3

Another alternative of voicemail notification data that may appear in the VNP.

| TYPE | BYTE CODE | LENGTH | DESCRIPTION |
|---|---|---|---|
| VENDOR_ID | 0 × 01 | Variable, Max 15 | Identifier representing the vendor which supplied the voicemail notification. (ASCII) |
| MAILBOX_ID | 0 × 02 | Variable, Max 15 | A unique id of the voice mailbox containing the voicemail message. It may be a string representing the voice mailbox. (ASCII) |
| FLAGS | 0 × 03 | Variable, Max 4 | Misc. bit flags. E.g., whether a password is required for authentication. (binary) |
| ACCESS_NUMBER | 0 × 04 | Variable, Max 15 | The voicemail access number that is to be called in order to play the message. (ASCII) |
| SECONDARY_ACCESS_NUMBER | 0 × 05 | Variable, Max 8 | The number which may need to be dialed upon connection to a PBX, in order to transfer the call to the voicemail system. (ASCII) |
| MESSAGE_COUNTS | 0 × 06 | 5 | Number of new, urgent, fax, and total messages, and max messages in mailbox. (binary) |
| PASSWORD_LIMITS | 0 × 07 | 2 | Min and Max password lengths. Defaults: min 4, max 7. (binary) |
| MESSAGE_ID | 0 × 08 | Variable, Max 8 | Unique id of the message within the voice mailbox. BCD with 0 × f filler bit if the number of digits is odd. |
| DTMF_CMDS | 0 × 09 | Variable length | Encoding of DTMF access control tones. Defaults defined in Appendix A. |
| CALLER_ID | 0 × 0A | Max 15 | The caller ID (phone number) of the caller who left the voicemail message, if available. (ASCII) |
| MESSAGE_LENGTH | 0 × 0B | 2 | The length in seconds of the voicemail message. |
| TIMESTAMP | 0 × 0C | 4 | The date/time at which the message was left. (binary, specified as the number of seconds since Jan. 1, 1970 00:00) |
| DELETE_LIST | 0 × 0E | Variable | The list of messages that were deleted during the last subscriber session. Lists the size of a MSG_ID followed by list of MESSAGE ID's. E.g., 00178, 00179 delete confirmations would have format 0 × 3, 0 × 00, 0 × 17, 0 × 8f, 0 × 00, 0 × 17, 0 × 9f |
| ACK_LIST | 0 × 0F | Variable | The list of messages acknowledged by the mobile during the last subscriber session. Lists the size of a MESSAGE_ID followed by a list of message ID's. E.g. 00178, 00179 would have the format 0 × 03 |

In Table 3, VENDOR_ID is a unique string representing the vendor which provided the voicemail notification. MAILBOX_ID represents the unique ID of the voice mailbox that contains the voicemail message. FLAGS are bit flags specifying various configuration options as well as characteristics of the voicemail message or the mailbox itself (e.g. whether the message is urgent, whether the user's mailbox is full, or whether a password is required for authentication once the call into the voicemail system is connected).

ACCESS_NUMBER is the phone number to be called in order to connect with the voicemail system and play the voicemail message. SECONDARY_ACCESS_NUMBER, which is optional, is a number to be dialed by the mobile device upon connection to the number specified in the ACCESS_NUMBER field. Dialing the secondary access number will transfer the call to the voicemail system. To connect to a corporate voicemail system, for example, the user is typically required to call a main phone number to connect to the corporate PBX, and subsequently dial an extension which transfers the call to the voicemail system.

MESSAGE_COUNTS is the number of new, urgent, and fax messages in the user's mailbox, as well as the number of messages in the mailbox and the maximum number of messages in the mailbox. PASSWORD_LIMITS is the minimum and maximum length of the voice mailbox password. There should be two bytes following the length byte. The first byte represents the minimum password length and second byte represents the maximum password length.

MESSAGE_ID is the unique ID of the message within the voice mailbox identified by MAILBOX_ID. CALLER_ID is the phone number of the caller who left the voicemail message. The number must be fully qualified, including country code, area/city code, and phone number. MESSAGE_LENGTH is the length in seconds of the voicemail message. TIMESTAMP is the time at which the voicemail message was deposited in the voice mailbox, specified as the number of seconds since midnight the Jan. 1, 1970 UTC.

DELETE_LIST is a list of message IDs that have been deleted by way of a DELETE command. This field should be in the format [TYPE][LENGTH][MSGID LENGTH][ID1][ID2] . . . [IDN]. ID1 . . . IDN should be nibble-packed BCD with an "f" filler bit if the number of digits in the message IDs is odd. The byte MSGID LENGTH byte indicates the number of bytes needed to represent the message ID, not the number of digits in the message ID. ACK_LIST is a list of messages that have been acknowledged by the device via the ACK command. This field is to be encoded in the same manner as the DELETE_LIST field.

DTMF_CMDS is a string of bytes specifying the DTMF sequences required for each supported access control command. The DTMF commands are specified in two-byte pairs, such that the first byte indicates the access control command, and the second byte is a BCD-encoding of the two-digit DTMF sequence required to invoke the command. See Table 4 below for one example of DTMF access control commands.

TABLE 4

One example of DTMF access control command definitions.

| COMMAND | BYTE CODE | DEFAULT VALUE |
|---|---|---|
| SET_MSG_ID | 0 × 01 | 0 × 11 |
| PLAY | 0 × 02 | 0 × 12 |
| PAUSE_PLAYBACK | 0 × 03 | 0 × 13 |
| RESUME_PLAYBACK | 0 × 04 | 0 × 14 |
| SKIP_FWD | 0 × 05 | 0 × 15 |
| SKIP_BACK | 0 × 06 | 0 × 16 |
| DELETE_MSG | 0 × 20 | 0 × 21 |
| FORWARD_MSG | 0 × 23 | 0 × 22 |
| REPLY_TO_MSG | 0 × 24 | 0 × 23 |
| ACK_MSG_IDS | 0 × 30 | 0 × 24 |
| DELETE_MSG_IDS | 0 × 31 | 0 × 25 |
| PLAY_GREETING | 0 × 40 | 0 × 41 |
| DELETE_GREETING | 0 × 41 | 0 × 42 |
| RECORD_GREETING | 0 × 42 | 0 × 43 |
| SET_PASSWORD | 0 × 43 | 0 × 44 |
| SET_GREETING | 0 × 44 | 0 × 45 |
| RECORD_NAME | 0 × 45 | 0 × 46 |
| DELETE_NAME | 0 × 46 | 0 × 47 |
| PLAY_NAME | 0 × 47 | 0 × 48 |

FIGS. 8 and 9 are basic flowcharts describing communication and processing of the voicemail notification data described in relation to FIGS. 4-7. FIG. 8 describes communication from the system to the mobile device, and FIG. 9 describes the reception and processing of such information at the mobile device. Beginning at a start block in FIG. 8, if a voicemail message is incoming as tested at step 902, then it will be received and stored at the voicemail system in a particular user's voice mailbox (step 904). In response, a voicemail notification message will be sent to a mobile device associated with the voice mailbox (step 906). The voicemail notification message includes voicemail message summary information and voicemail retrieval/processing information as described above.

Beginning at a start block in FIG. 9, if a voicemail message is stored in the voicemail system at step 1002, then a voicemail notification message will be received at the mobile device shortly thereafter (step 1004). This voicemail notification message includes voicemail message summary information and voicemail retrieval/processing information as described above, which is stored in the mobile device. The mobile device alerts the end user through its user interface (step 1006). Using the voicemail message summary information, the notification is preferably displayed in the form of a message header line in the visual display of the mobile device (step 1008). Using the voicemail processing information, the mobile devices provides transparent voicemail retrieval and processing functions at the user interface (step 1010). To do this, the mobile device is preferably provided with a graphical user interface (GUI) having visual objects associated with basic voicemail functions such as PLAY, REWIND, FAST FORWARD, SKIP BACK, SKIP FORWARD, SAVE, and DELETE. Additional voicemail notifications may be subsequently received and handled similarly. Advantageously, the end user needs not remember voicemail system specific commands for each voicemail system and therefore voicemail processing is made much easier. A common user interface may be utilized for each different voicemail system in which voicemail messages are kept.

FIG. 10 is a flowchart which describes an overall system method for use in receiving and manipulating voicemail messages from a mobile device. In step 1000, a call is received for a user. This call may come from any source, such as a landline telephone, a corporate phone, or a mobile phone. In step 1002, a traditional private branch exchange (PBX) system sends the call to a voicemail system. In step 1004, a voicemail message from the call is recorded and saved. In step 1006, the voicemail system sends a summary of call details to the PBX interface. As checked in step 1008 if the user does not have a mobile device, the call remains in the voicemail system until the user can retrieve the call by conventional methods at an end block 1010. As checked in step 1008, if the user does have a mobile device, then the voicemail message is placed in unified message system (UMS) storage in step 1012.

In step 1014, the UMS sends a voicemail notification message to the mobile device. In step 1016, upon receipt of the voicemail notification message the mobile device alerts the user. In step 1018, the user selects to "open" the message and thereby issues a command to retrieve the message. In response, in step 1020, the mobile device calls the UMS using the voicemail system access number provided in the voicemail notification message. In step 1022, once the mobile device has connected to the UMS, without further user intervention the mobile device sends the DTMF tone commands that identify the particular voicemail message and subsequently the command that the user wishes to perform on the voicemail message. The DTMF tone commands associated with a particular voicemail service provider reside in a database on the mobile device. Alternatively, the DTMF tone commands may be provided in the voicemail notification payload of the voicemail notification message. In step 1024, the UMS authenticates the request when the device sends the DTMF tones representing the user's password. This is done as a security precaution.

In step 1026, the UMS determines whether the voicemail message is still available. If the voicemail message is not available, then in step 1028 the UMS sends the mobile device a response that the voicemail is invalid. This may be a response that is audible to the end-user (e.g. a voice response indicating: "This message is invalid. Please try again."). If the voicemail message is available, then in step 1030 the UMS executes the command on the voicemail message. Once the voicemail command is completed, in step 1032 the UMS waits for the user to issue new commands or may prompt the user for any new commands. If there are new commands in step 1032, the UMS preferably executes them in step 1030. If there are no new commands for this voicemail in step 1032, then in step 1034 the user may select a different voicemail message. If the user chooses to select a different voicemail message in step 1034, then the mobile device preferably sends the corresponding DTMF tone commands at step 1022 for the new voicemail message that the user wishes to retrieve. If the user does not wish to select another voicemail message in step 1034, the user may terminate the connection or the UMS may timeout after a period of inactivity. In either case, the session with the UMS ends.

FIGS. 11-16 are illustrations of a visual display of a mobile device showing examples of voicemail message related data. As will be described, the mobile device preferably provides a graphical user interface (GUI) with visual objects in the visual display for end-user processing of voicemail messages. As an alternative to using a GUI at the mobile device for processing voicemail messages, mechanical switches associated with function indicators (e.g. PLAY or "→", FAST FORWARD or "→→", or REWIND or "←←", etc.) may be utilized with or without displaying visual objects in the visual display.

Figure 11:
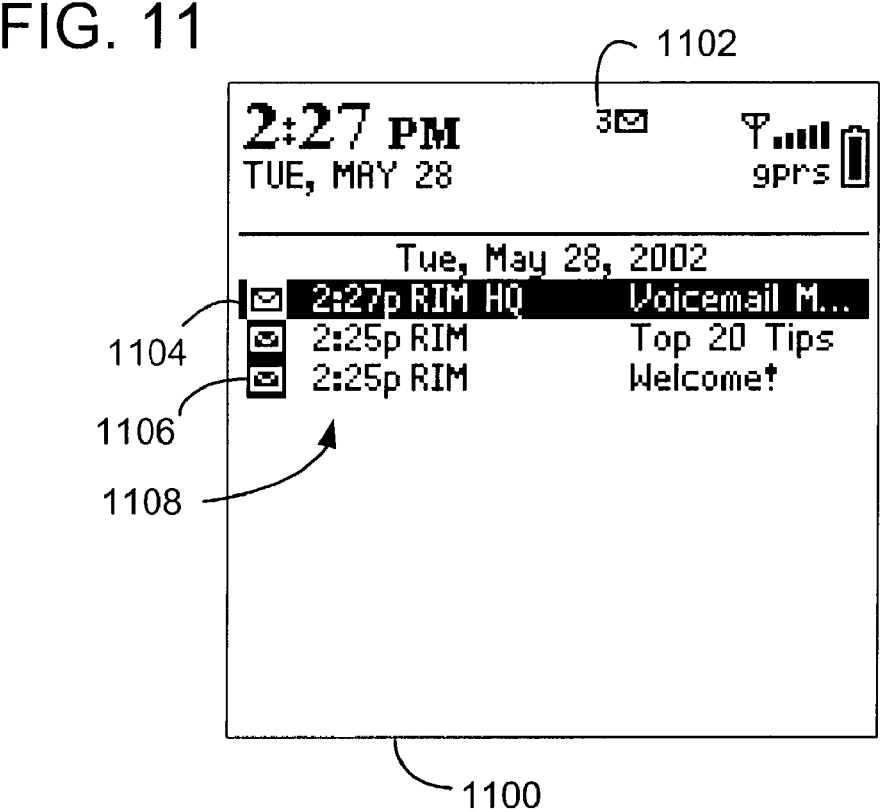
FIGS. 11-16 are illustrations of a visual display of the mobile communication device, showing voicemail message data and a graphical user interface (GUI) for retrieving and processing voicemail messages.

In FIG. 11, an example of a message list 1108 which is displayed on a visual display 1100 of a mobile device is shown. Message list 1108 includes a plurality of message header lines including a message header line 1106 for an e-mail or SMS message and a voicemail message header line 1104 for a voicemail message. Each message header line shows message summary information from the VNP (e.g. a message time stamp and caller identification). Visual display 1100 also displays an indication of the number of new messages received 1102 at the mobile device. Although three message header lines are shown in FIG. 11, any number of message header lines may be simultaneously displayed.

Figure 12:
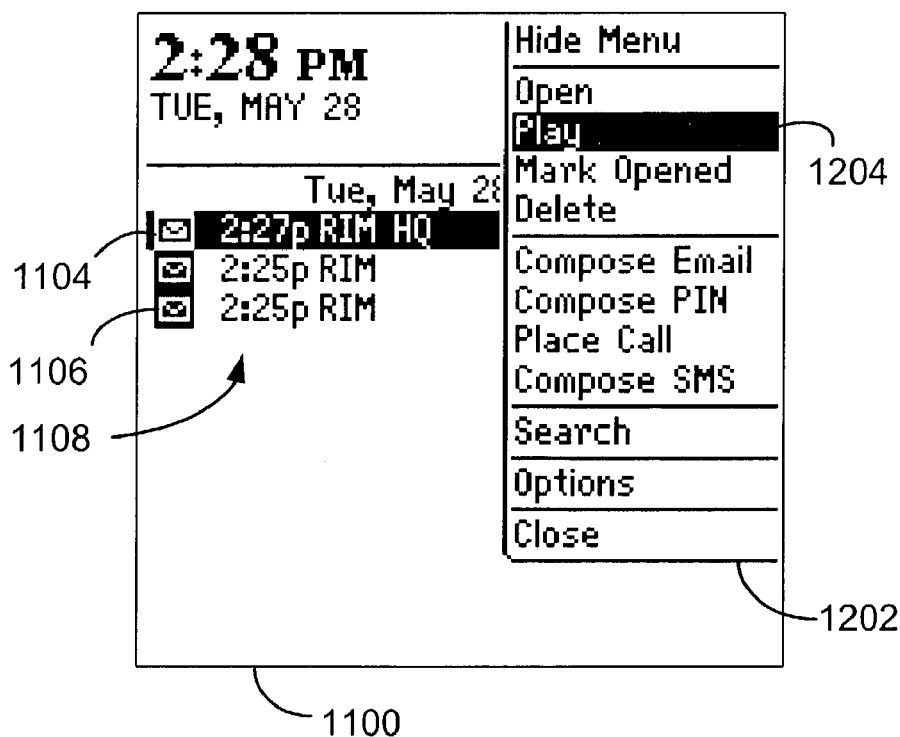

In FIG. 12 it is shown that voicemail message header line 1104 from FIG. 11 is selected from message list 1108. When a voicemail message header line is selected, a pull-down menu 1202 of functions from which the user may select is displayed on visual display 1100. As shown, the possible functions include OPEN, PLAY, MARK OPENED, DELETE, COMPOSE E-MAIL, COMPOSE PIN, PLACE CALL, COMPOSE SMS, SEARCH, OPTIONS, and CLOSE. When a voicemail message header line is selected from message list 1108, the default option in menu 1202 is a PLAY function 1204. When PLAY function 1204 is selected, the mobile device preferably calls the appropriate voicemail telephone access number listed in the VNP and subsequently sends the appropriate DTMF tone command(s) from the VNP to play the selected voicemail message. Alternately, the user may OPEN the voicemail notification to display further information about the voicemail.

Figure 13:
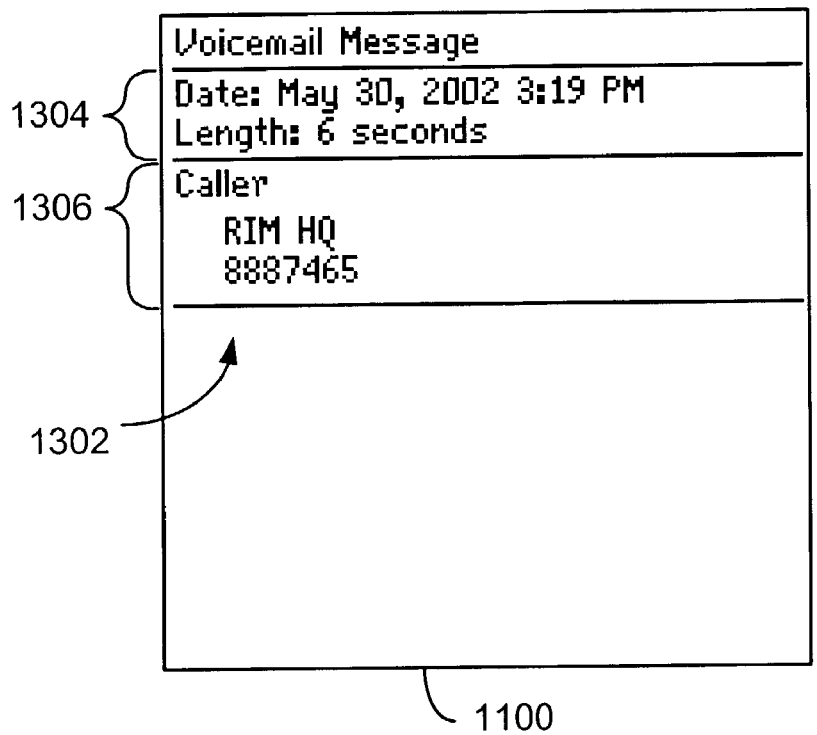
Figure 14:
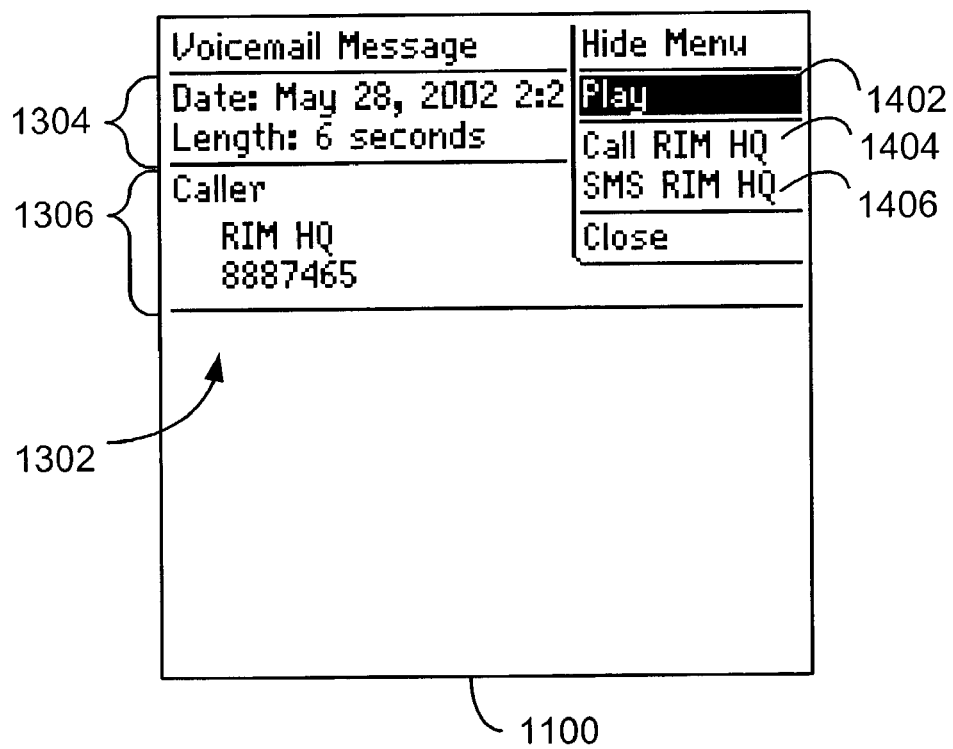

In FIG. 13 it is shown that voicemail message header line 1104 from FIG. 11 is "opened" to view further voicemail summary information 1302 from the VNP, such as information 1304 indicative of a message date and time and a message length, and a caller identification 1306 (e.g. name and phone number). FIG. 14 shows the function options available to the user with the opened voicemail summary information 1302. A pull-down menu shows the choices available, the default option being a PLAY function 1402. Other function options that may be available to the user are a CALL function 1404 to call (back) the caller, or an SMS send function 1406 to send an SMS message to the caller. Alternative options that may be available to the user are to send an e-mail to the caller or to send a fax to the caller. When PLAY function 1204 is selected, the mobile device preferably calls the appropriate voicemail telephone access number listed in the VNP and subsequently sends the appropriate DTMF tone command(s) from the VNP to play the selected voicemail message.

With respect to FIGS. 11-14, it is noted that since the each voicemail summary data is provided in its own data field in the VNP, it may be suitably manipulated and positioned as appropriate in visual display 110 by the mobile device with or without a heading or other useful surrounding explanatory text (e.g. "Length:" and "seconds" in the "Length: 6 seconds" line). This is in contrast to a message (e.g. an SMS message) which may carry data in a generic field for visual display.

Figure 15:
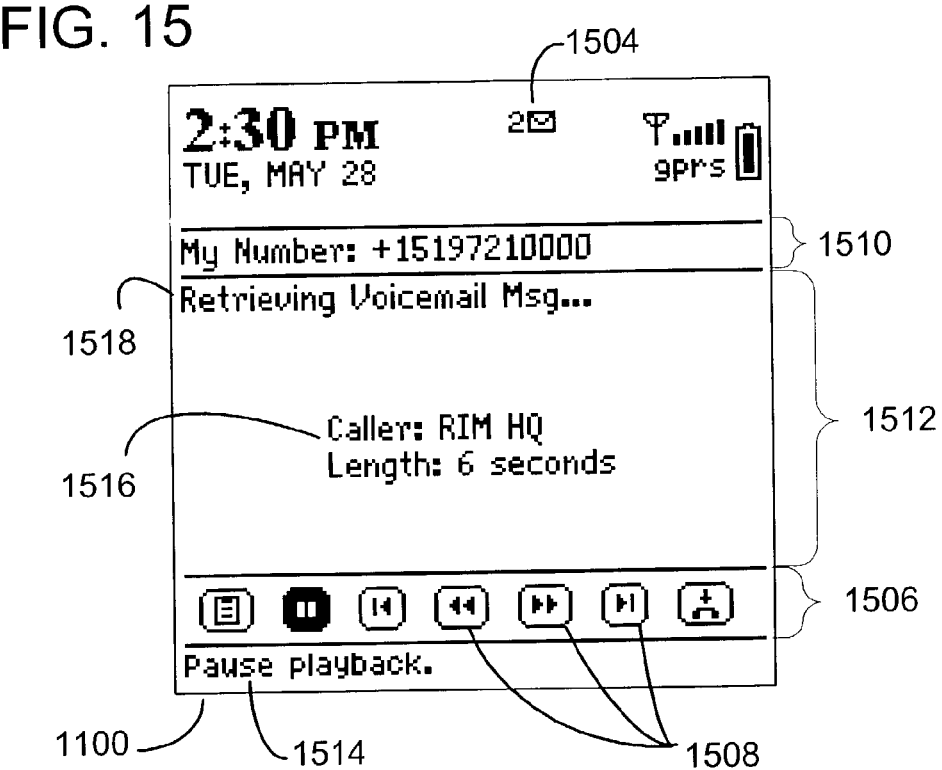

FIG. 15 shows visual display 1100 where the PLAY function for the voicemail message was just selected by the user. Visual display 1100 shows a number of new messages received 1504, number information 1510, and processing status information 1518, as well as calling party identification and message length information 1516 which are in a separate viewing area 1512. Visual display 1100 also may include a control bar 1506 from which the user can manipulate or process the voicemail message. Control bar 1506 has a plurality of functions 1508 from which the user may select. These functions may be in the form of visual buttons or icons and may include, but are not limited to, such functionality as PLAY, PAUSE, REWIND, FAST FORWARD, SKIP BACK, SKIP FORWARD, and HANG-UP. As an alternative to this VCR-type GUI interface, a pull-down menu offering the same functions as visual objects may be utilized. The user may scroll through these icons or buttons and highlight the button the user wishes to select. In the example shown in FIG. 15, control bar 1506 shows that "PAUSE" has been selected. A status line 1514 reflects that PAUSE has been selected. Note that the number of new messages received 1504 has changed (i.e. from "3" to "2") to reflect that this voicemail message has been reviewed.

Figure 16:
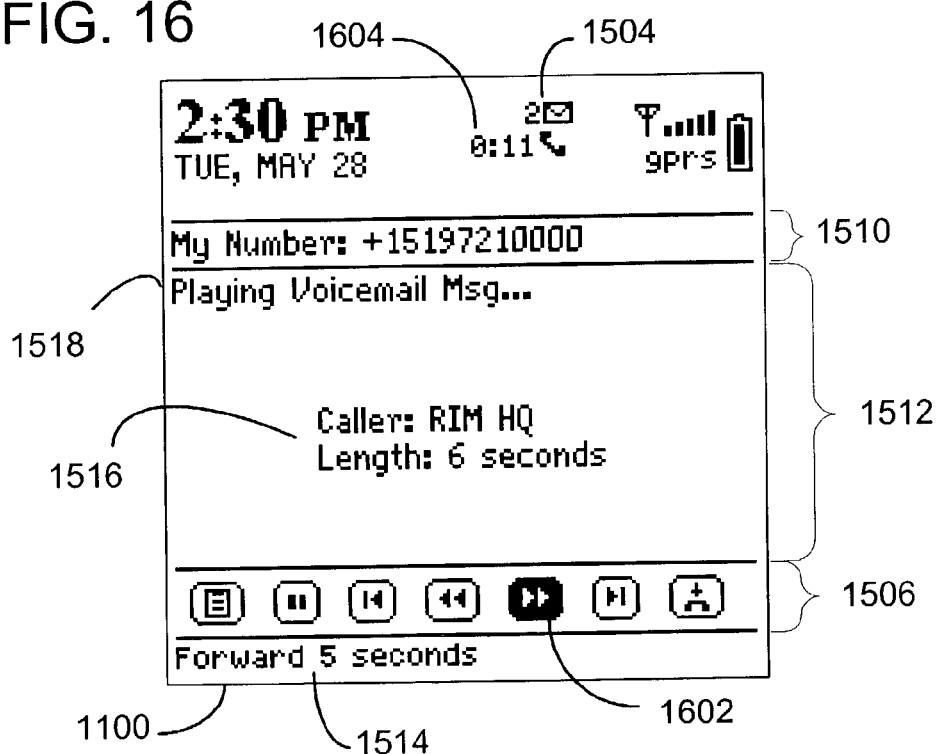

FIG. 16 shows visual display 1100 when the mobile device is playing the voicemail message. When playing the voicemail message, a connect icon 1604 preferably appears which indicates the length of time that the mobile device has been connected to the unified messaging system. In this example, the user has scrolled along control bar 1506 to select FAST FORWARD function 1602. Status line 1514 subsequently changes to reflect what functionality is now highlighted on control bar 1506.

It is noted that voicemail functions for any voicemail message of any voicemail system may be selected by the end user at any time, even during the processing of a different voicemail message on a different voicemail system. For example, during the playing of a first voicemail message on a first voicemail system, an end user may select to play a second voicemail message on a second voicemail system. In this case, the mobile device will disconnect from the first voicemail system, call the second voicemail system, and send one or more commands to play the selected second voicemail message.

The above-described embodiments of the present application are intended to be examples only. Those of skill in the art may effect alterations, modifications and variations to the particular embodiments without departing from the scope of the application. For example, instead of using a GUI at the mobile device for processing voicemail messages, mechanical switches associated with function indicators (e.g. PLAY or "→", FAST FORWARD or "→→", or RE or "←←", etc.) may be utilized with or without displaying visual objects in the visual display. The invention described herein in the recited claims intend to cover and embrace all suitable changes in technology.

The invention claimed is:

1. In a mobile communication device, a method of processing voicemail messages comprising:
storing, in memory, a first dual tone-multiple frequency (DTMF) command set for voicemail message processing functions of a first voicemail system;
storing, in the memory, a second DTMF command set for voicemail message processing functions of a second voicemail system which is different from the first DTMF command set for the first voicemail system;
receiving, through a wireless transceiver, a voicemail notification message associated with a voicemail message received at one of the first and the second voicemail systems;
detecting, through a user interface, an end-user selection of a visual object or switch which is visually indicative of a voicemail message processing function;
causing the following acts to be performed in response to detecting the end-user selection of the visual object or switch:
selecting, from one of the first and the second DTMF command sets corresponding to the one of the first and the second voicemail systems at which the voicemail message was received a DTMF command code corresponding to the voicemail message processing function; and
causing the DTMF command code to be sent to the one of the first and the second voicemail systems for invoking the voicemail message processing function at the one of the first and the second voicemail systems.

2. The method of claim 1, wherein the voicemail message processing function comprises one of PLAY, REWIND, FAST FORWARD, SKIP BACK, SKIP FORWARD, SAVE, and DELETE.

3. The method of claim 1, wherein the visual object or switch comprises a visual object of a graphical user interface (GUI) of the user interface.

4. The method of claim 1, wherein the visual object or switch comprises a mechanical switch of the user interface.

5. The method of claim 1, further comprising:
prior to detecting the end-user selection of the visual object or switch:
visually displaying, in a display of the mobile communication device, voicemail message header information associated with the voicemail message.

6. The method of claim 1, further comprising:
causing a connection to be established between the mobile communication device and the one of the first and the second voicemail systems.

7. A mobile communication device, comprising:
one or more processors;
a wireless transceiver coupled to the one or more processors;
the wireless transceiver configured to receive one or more voicemail notification messages associated with one or more voicemail messages received at one or more voicemail systems which include a first voicemail system and a second voicemail system;
memory for storing a first dual tone-multiple frequency (DTMF) command set for voicemail message processing functions of the first voicemail system and a second DTMF command set for voicemail message processing functions of the second voicemail system which is different from the first DTMF command set for the first voicemail system;
a user interface having a visual display;
the visual display configured to display voicemail message header information associated with the one or more voicemail notification messages received at one of the first and the second voicemail systems;
the user interface providing a plurality of end-user selectable visual objects or switches corresponding to a plurality of voicemail message processing functions;
the plurality of voicemail message processing functions including PLAY, SKIP BACK, and SKIP FORWARD;
each visual object or switch having a visual indicator indicative of its voicemail message processing function; and
the one or more processors configured to perform the following acts in response to detecting an end-user selection of one of the visual objects or switches: select, from one of the first and the second DTMF command sets corresponding to the one of the first and the second voicemail systems at which the voicemail message was received, a DTMF command code corresponding to the voicemail message processing function and to cause the DTMF command code to be sent to the one of the first and the second voicemail systems to invoke the voicemail message processing function at the one of the first and the second voicemail systems indicated by the visual indicator of the visual object or switch.

8. The mobile communication device of claim 7, wherein the plurality of visual objects or switches comprises visual objects of a graphical user interface (GUI).

9. The mobile communication device of claim 7, wherein the one or more processors are further configured to cause a connection to be established between the mobile communication device and the one of the first and the second voicemail systems.

10. The mobile communication device of claim 7, wherein the plurality of visual objects or switches comprise visual objects of a graphical user interface (GUI) which includes:
visual objects corresponding to "PLAY", "REWIND", and "FAST FORWARD".

11. The mobile communication device of claim 7, wherein the plurality of visual objects or switches comprise visual objects of a graphical user interface (GUI) which includes:
visual objects corresponding to "SKIP BACK", and "SKIP FORWARD".

12. The mobile communication device of claim 7, wherein the plurality of visual objects or switches includes:
a first visual object or switch corresponding to "SAVE" for saving a voicemail message and a second visual object or switch corresponding to "DELETE" for deleting a voicemail message.

13. A mobile communication device, comprising:
one or more processors;
a wireless transceiver coupled to the one or more processors;

the wireless transceiver configured to receive a first voicemail notification message associated with a first voicemail message received at a first voicemail system;

the wireless transceiver configured to receive a second voicemail notification message associated with a second voicemail message received at a second voicemail system;

a user interface having a visual display;

the visual display configured to display first voicemail message header information associated with the first voicemail message and second voicemail message header information associated with the second voicemail message;

the user interface providing a plurality of end-user selectable visual objects or switches corresponding to a plurality of voicemail processing functions;

each visual object or switch having a visual indicator indicative of its voicemail processing function;

memory coupled to the one or more processors;

the memory for storing a first set of voicemail processing information for the first voicemail system, the first set of voicemail processing information including a first dual tone-multiple frequency (DTMF) command set for voicemail message processing functions of the first voicemail system;

the memory for storing a second set of voicemail processing information for the second voicemail system, the second set of voicemail processing information including a second DTMF command set for voicemail message processing functions of the second voicemail system which is different from the first DTMF command set;

the one or more processors configured to use the first DTMF command set to invoke voicemail message functions at the first voicemail system through the wireless transceiver in response to detecting end-user selections of the visual objects or switches in connection with the first voicemail message; and the one or more processors configured to use the second DTMF command set to invoke the voicemail message functions at the second voicemail system through the wireless transceiver in response to detecting end-user selections of the visual objects or switches in connection with the second voicemail message.

14. The mobile communication device of claim 13, wherein the plurality of visual objects or switches comprises visual objects of a graphical user interface (GUI).

15. The mobile communication device of claim 13, wherein the plurality of selectable visual objects or switches comprises mechanical switches at the user interface.

16. The mobile communication device of claim 13, wherein the first set of voicemail processing information includes a first voicemail access telephone number of the first voicemail system used for connecting with the first voicemail system, and wherein the second set of voicemail processing information includes a second voicemail access telephone number of the second voicemail system used for connecting with the second voicemail system.

17. The mobile communication device of claim 13, wherein the first DTMF command set includes commands of the first voicemail system corresponding to PLAY, REWIND, and FAST FORWARD, and wherein the second DTMF command set includes commands of the second voicemail system corresponding to PLAY, REWIND, and FAST FORWARD.

18. The mobile communication device of claim 13, wherein the first DTMF command set includes commands for the first voicemail system corresponding to PLAY, SKIP BACK, and SKIP FORWARD, and wherein the second DTMF command set includes commands for the second voicemail system corresponding to PLAY, SKIP BACK, and SKIP FORWARD.

19. The mobile communication device of claim 13, further comprising:
wherein the user interface provides a plurality of end-user selectable visual objects or switches further corresponding to a plurality of voicemail processing functions which include SKIP BACK and SKIP FORWARD.

20. The mobile communication device of claim 13, further comprising:
wherein the user interface provides a plurality of end-user selectable visual objects or switches further corresponding to a plurality of voicemail processing functions which include SAVE and DELETE.

21. In a mobile communication device having a user interface which includes a visual display and a plurality of end-user selectable visual objects or switches corresponding to a plurality of voicemail processing functions, each visual object or switch having a visual indicator indicative of its voicemail processing function, a method for use in processing voicemail messages comprising the acts of:

storing, in memory, a first set of voicemail processing information for a first voicemail system, the first set of voicemail processing information including a first dual tone-multiple frequency (DTMF) command set for voicemail message processing functions of the first voicemail system;

storing, in the memory, a second set of voicemail processing information for a second voicemail system, the second set of voicemail processing information including a second DTMF command set for voicemail message processing functions of the second voicemail system which is different from the first DTMF command set;

receiving, through a wireless transceiver, a first voicemail notification message associated with a first voicemail message received at the first voicemail system;

displaying, in the visual display, first voicemail message header information associated with the first voicemail message;

in response to detecting end-user selections of the visual objects or switches in connection with the first voicemail message, invoking voicemail message functions at the first voicemail system through the wireless transceiver with use of the first DTMF command set stored in memory;

receiving, through the wireless transceiver, a second voicemail notification message associated with a second voicemail message received at the second voicemail system;

displaying, in the visual display, second voicemail message header information associated with the second voicemail message; and in response to detecting end-user selections of the visual objects or switches in connection with the second voicemail message, invoking the voicemail message functions at the second voicemail system through the wireless transceiver with use of the second DTMF command set stored in memory.

22. The method of claim 21, wherein the plurality of visual objects or switches comprises visual objects of a graphical user interface (GUI).

23. The method of claim 21, wherein the plurality of selectable visual objects or switches comprises mechanical switches at the user interface.

24. The method of claim 21, wherein the first set of voicemail processing information includes a first voicemail access telephone number of the first voicemail system used for connecting with the first voicemail system, and wherein the second set of voicemail processing information includes a second voicemail access telephone number of the second voicemail system used for connecting with the second voicemail system.

25. The method of claim 21, wherein the first DTMF command set includes commands of the first voicemail system corresponding to PLAY, REWIND, and FAST FORWARD, and wherein the second DTMF command set includes commands of the second voicemail system corresponding to PLAY, REWIND, and FAST FORWARD.

26. The method of claim 21, wherein the first DTMF command set includes commands of the first voicemail system corresponding to PLAY, SKIP BACK, and SKIP FORWARD, and wherein the second DTMF command set includes commands of the second voicemail system corresponding to PLAY, SKIP BACK, and SKIP FORWARD.

27. The method of claim 21, wherein the first DTMF command set includes commands of the first voicemail system corresponding to SAVE and DELETE, and wherein the second DTMF command set includes commands of the second voicemail system corresponding to SAVE and DELETE.

* * * * *